United States Patent [19]

Eng et al.

[11] Patent Number: 5,255,265
[45] Date of Patent: Oct. 19, 1993

[54] CONTROLLER FOR INPUT-QUEUED PACKET SWITCH

[75] Inventors: Kai Y. Eng, Middletown; Mark J. Karol, Fair Haven, both of N.J.

[73] Assignee: AT&T Bell Laboratories, Murray Hill, N.J.

[21] Appl. No.: 878,801

[22] Filed: May 5, 1992

[51] Int. Cl.$^5$ ............................................. H04L 12/56
[52] U.S. Cl. .................................................... 370/60
[58] Field of Search ................... 370/60, 60.1, 94.1, 370/94.2, 61

[56] References Cited

U.S. PATENT DOCUMENTS

| 4,947,387 | 8/1990 | Knorpp et al. | 370/60 |
| 4,979,165 | 12/1990 | Dighe et al. | 370/60 |
| 5,130,975 | 7/1992 | Akata | 370/60 |
| 5,157,654 | 10/1992 | Cisneros | 370/60 |

OTHER PUBLICATIONS

M. J. Karol et al., GLOBECOM '1986 Conf. Rec., Dec. 1986, "Input Versus Output Quequeing on a Space-Division ... ," pp. 659-665.
J. Y. Hui et al., IEEE J. on Selected Areas in Comm., vol. SAC-5, Oct. 1987, "A Broadband Packet Switch . . . , " pp. 1264-1273.
H. Obara et al., ICC'1988 Conf. Rec., Jun. 1988, "High Speed Transport Processor for Broad-Band ... , " pp. 922-927.
M. G. Hluchyj et al., IEEE J. on Selected Areas in Comm., vol. 6, No. 9, Dec. 1988, "Queueing in High-Performance Packet Switching," pp. 1587-1597.
A. Pattavina, IEEE J. on Selected Areas in Comm., vol. 6, No. 9, Dec. 1988, "Multichannel Bandwidth Allocation in a Broadband . . . ," pp. 1489-1499.
Y. Oie et al., ICC'1989 Conf. Rec., Jun. 1989, "Effect of Speedup in Nonblocking Packet Switch," pp. 410-414.
H. Ahmadi et al., IEEE J. on Selected Areas in Comm., vol. 7, No. 7, Sep. 1989, "A Survey of Modern High-Performance . . . , " pp. 1091-1103.
H. Obara et al., International J. of Digital & Analog Cabled Systems, vol. 2, No. 4, Oct.-Dec. 1989, "An Efficient Contention Resolution Algorithm . . . , " pp. 261-267.
F. Tobagi, Proc. of the IEEE, vol. 78, No. 1, Jan. 1990, "Fast Packet Switch Architectures for Broadband ... , " pp. 133-167.
A. Pattavina, International J. of Digital & Analog Comm. Syst., vol. 3, No. 3, Jul.-Sep. 1990, "Performance Evaluation of ATM Switches... , " pp. 277-286.
H. Obara et al., SUPERCOMM/ICC'1990 Conf. Rec., Apr. 1990, "An ATM Cross-Connect System for Broadband . . . , " pp. 839-843.
Y. Oie et al., SUPERCOMM/ICC'1990 Conf. Rec., Apr. 1990, "Survey of the Performance of Nonblocking Switches . . . , " pp. 737-741.
I. Iliadis et al., SUPERCOMM/ICC'1990 Conf. Rec., Apr. 1990, "Performance of Packet Switches with Input . . . , " pp. 747-753.
Y. Oie et al., Proc. INFOCOM'1990, Jun. 1990, "Survey of Switching Techniques in . . . , " pp. 1242-1251.
H. Obara, Elec. Lett., vol. 27, No. 7, Mar. 1991, "Optimum Architecture for Input Queueing ATM Switches," pp. 555-557.
S. Li, Proc. INFOCOM'1991, Apr. 1991, "Performance of Trunk Grouping in Packet Switch Design," pp. 688-693.
H. Obara et al., Elec. Lett., vol. 28, No. 1, "Input and Output Queueing ATM Switch Architecture . . . ," pp. 22-24.

Primary Examiner—Wellington Chin
Attorney, Agent, or Firm—Gregory C. Ranieri

[57] ABSTRACT

Significant throughput improvement is achieved for an input queued packet switch using output port schedulers by permitting the output schedulers to recycle or reassign cell transmission times from input ports which are unable to use them. When an output scheduler assigns a cell transmission time to an input port and that input port is unable to use the assigned transmission time due to a scheduling conflict, for example, the input port makes a new request for the same output port during the next subsequent request period and then returns the unusable transmission time assignment back to the output scheduler. The output scheduler stores the returned transmission time in a separate queue for assignment to later requests for the particular output port. Throughput performance is improved from 58% (without time slot recycling) to 92% (with time slot recycling) for random packet cell traffic models.

9 Claims, 3 Drawing Sheets

CONTROLLER FOR INPUT-QUEUED PACKET SWITCH

TECHNICAL FIELD

This invention relates to packet switching and, more particularly, to controllers and schedulers for improving the throughput of input-queued packet switches.

BACKGROUND OF THE INVENTION

Contention among simultaneously arriving packet cells for the same output port of a packet switch is resolved in favor of only one packet cell at a time. As a result, some form of temporary storage is required for the remaining packet cells. Temporary storage provided on the input side of the switch is an input queue whereas storage of the packet cells on the output side of the switch is called an output queue. With respect to each input/output line of the switch, the input queue permits loading up to a maximum of 58% whereas the output queue permits loading up to 100% when the first in, first out (FIFO) storage is utilized.

The reason for such poor performance in input-queued packet switches is related to a problem known a head-of-line blocking. To overcome this problem, it has been proposed that the storage devices in the input queue be non-FIFO or random access. In addition, scheduling of packet cells from different input queues for the same output port is performed in two phases to result in non-conflicting transmission of the packet cells. See, for example, an article by Obara et al., *Int'l. J. of Digital and Analog Cabled Systems*, Vol. 2, No. 4, pp. 261-7 (1989). This type of scheduling is called output scheduling. It permits improvement of the switch throughput from 58% to 65% for random packet cell traffic models.

SUMMARY OF THE INVENTION

Significant throughput improvement is achieved for an input queued packet switch using output port schedulers by permitting the output schedulers to recycle or reassign cell transmission times from input ports which are unable to use them. When an output scheduler assigns a cell transmission time to an input port and that input port is unable to use the assigned transmission time due to a scheduling conflict, for example, the input port makes a new request for the same output port during the next subsequent request period and then returns the unusable transmission time assignment back to the output scheduler. The output scheduler stores the returned transmission time in a separate queue for assignment to later requests for the particular output port. Throughput performance, as a result of this invention, is improved from 58% to 92% for random packet cell traffic models.

Further throughput improvements are realizable by employing input port grouping. This requires that a plurality of input queues are grouped or linked together in such a way that packet cell transmissions for a particular transmission time are selected from any of the input queues in the same group. Input grouping results in a throughput improvement to 95% for random packet cell traffic models.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In the move toward high performance packet switching for integrated service networks and multi-processor interconnects, attention has been focussed on those packet switching architectures which provide many simultaneous input/output paths through the switch fabric and which allow the internal switched paths to be time-multiplexed in a statistical, rather than a deterministic, fashion. Such architectures offer the capability for high speed transmission in the range of hundreds of Mbps on each input and output port of the switch thereby creating a total switch capacity on the order of several hundred Gbps. High speed switch operation translates into a need for substantially hardware-based packet processing to handle the packet headers containing path information such as source and destination addresses used by the switch fabric to route the packets.

As the switching speed increases, packet congestion becomes even more problematic and important. Packet arrivals are unscheduled. Two or more packets may arrive simultaneously on different input ports destined for the same output port. Only one of these packets will be allowed to pass through the switch in a particular time slot. All other contending packets must be stored in a queue for later transmission to the particular output port. Output scheduling and packet storage in non-FIFO queues are two techniques employed in dealing effectively in the prior art with this type of congestion problem for input-queued packet switches.

Figure 1:
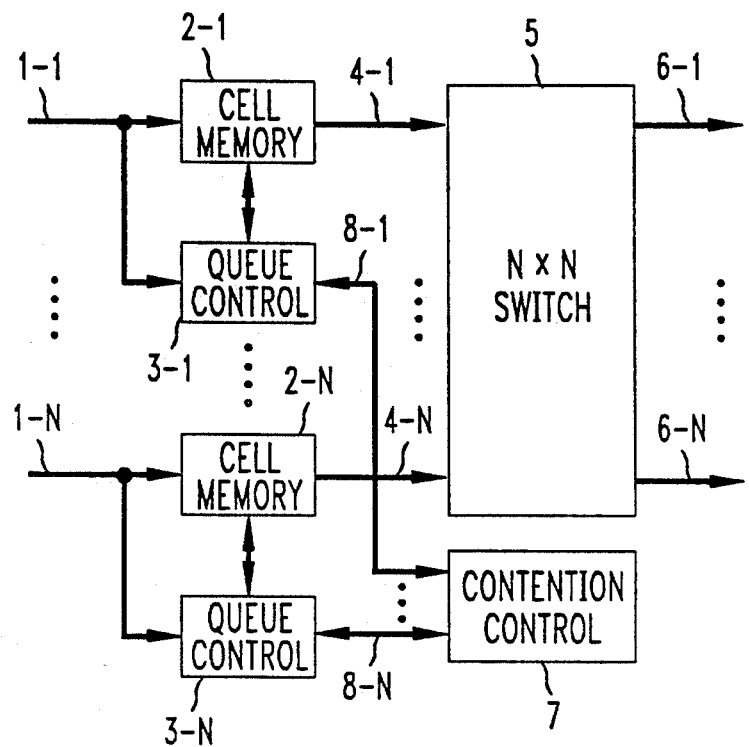
FIG. 1 is a simplified block diagram for an input-queued packet switch.

An input-queued packet switch is shown in FIG. 1 in simplified block diagram form. The architecture includes N input ports 1-1 through 1-N, a plurality of cell memories 2-1 through 2-N together with an associated plurality of queue controls 3-1 through 3-N, contention control 7, and N×N switch 5 having both N switch input ports 4-1 through 4-N and N switch output ports 6-1 through 6-N. It should be noted that N is a positive integer greater than 1. In the FIG., elements on only the first and $N^{th}$ input/output ports have been shown to promote clarity of presentation and understanding. It is to be understood that the terms "packet", "cell", and "packet cell" are used herein interchangeably to refer to a block of information in a predetermined format such as asynchronous transfer mode (ATM), for example. In the ATM format, a cell refers to a fixed length packet defined by the standard to have a total of 53 bytes divided between a header (5 bytes) and a payload (48 bytes). Also, the terms "time slot" and "transmission time" are used interchangeably herein to connote generally a time interval spanning a single packet.

Many types of switches are contemplated for realizing N×N switch 5. Usually, a space division switch is provided for realizing a cross-connect capability between the switch input ports and the switch output ports. The use of time division multiplexing with the space division switch permits realization of a time-slotted space division switch. Both symmetric (e.g., N×N) and asymmetric (e.g., N×M) switch architectures are contemplated. Also blocking and non-blocking architectures are contemplated although the latter have significant throughput advantages over the former. Finally, it is contemplated that self-routing switches be used for switch 5. Various self-routing switches are well known in the art and are useful in achieving a large capacity cross-connect capability. In the particular example from experimental practice described herein, switch 5 includes an N×N, non-blocking, self-routing, time-slotted, space division switch.

Cell memory 2-1 is positioned between input port 1-1 and switch input port 4-1. Cell memory 2-1 is realized as a random access memory with sufficient capacity for storing the packets received on input port 1-1. Packets are stored in cell memory 2-1 under control of queue control 3-1. As shown in FIG. 1, queue control 3-1 is responsive to the received packet or some significant portion thereof such as the packet header or the like. Packets are also retrieved from cell memory 2-1 at the appropriate transmission time under control from queue control 3-1. Transmission times for the packets stored in cell memory 2-1 are negotiated between queue control 3-1 and contention control 7 according to a request and arbitration procedure over lead 8-1.

Contention control is performed in a centralized element for the entire switch fabric to schedule transmission times for the packet cells. At the appropriate transmission time, the exemplary self-routing space switch 5 receives cells from the switch input ports 4 and routes them to the appropriate switch output ports using self-routing control based on physical routing information contained in the cell.

Contention control 7 performs output scheduling according to a two phase scheduling technique so that no two input cells are assigned the same transmission time to the same switch output port. The two phases are a request phase and an arbitration phase. The article by Obara et al. cited above provides a detailed explanation of two phase scheduling. In the request phase, each queue control 3 notifies contention control 7 about those cells destined for a particular switch output port which need assignment of a transmission time. In the arbitration phase, contention control 7 checks its internal scheduling table for the particular switch output port to determine the next available transmission time slot or slots which can be assigned. Available transmission times are then assigned to the cells via the requesting queue control. In the queue control, it is necessary to check whether an assigned time is reserved by any other cell. If there is no reservation, then the cell is sent at the assigned transmission time. If the transmission time is already reserved to another cell, the cell via the queue control returns to request a transmission time in the next round of scheduling.

Figure 2:
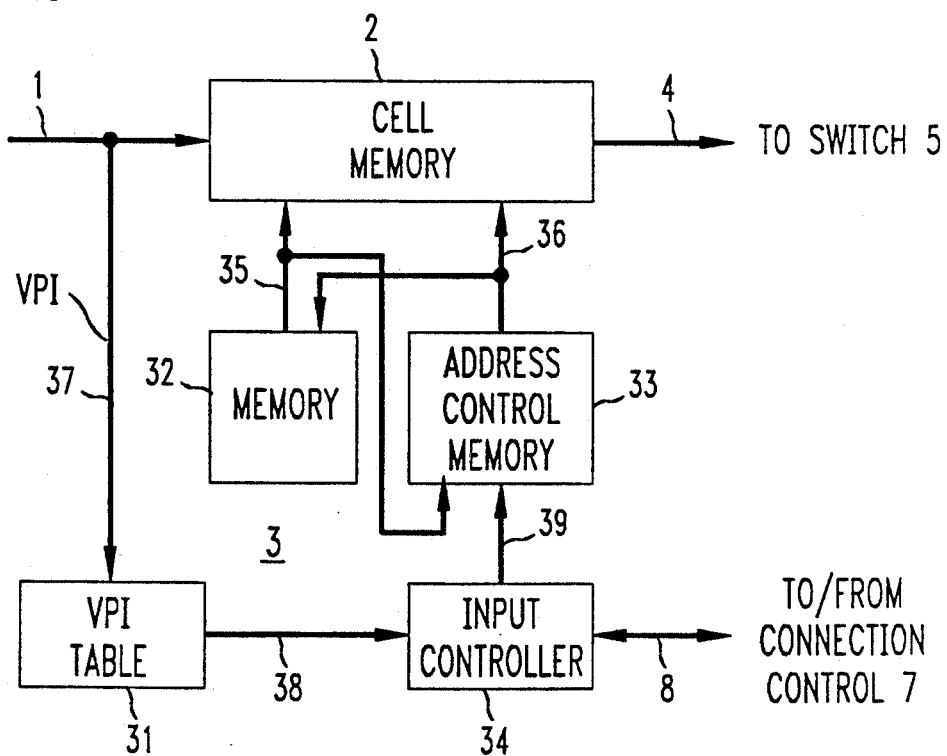
FIG. 2 is a more detailed block diagram for the queue control element of a single input port shown in FIG. 1.

FIG. 2 shows a more detailed block diagram of the cell memory and queue control. Cell memory 2 is depicted as a random access memory having sufficient capacity to store packet cells input on port 1. Output of cell memory 2 is provided via switch input port 4. Queue control 3 includes VPI table 31, memory 32, address control memory 33, and input controller 34. VPI table 31 performs cell address translation and provides physical routing information for each cell. VPI table 31 stores a list of virtual path identifiers used in accordance with the ATM standard. The virtual path identifier is located in the header portion of the ATM cell and is provided to VPI table 31 via lead 37. VPI table 31 responds to the received virtual path identifier to output a cell destination on lead 38. The cell destination tells input controller 34 to which switch output port the particular cell is to be routed.

Memory 32 is a random access memory which maintains a list of all vacant memory locations in cell memory 2. The next cell memory address into which an arriving cell is written is supplied by memory 32 on lead 35. Memory 32 makes this address available to address control memory 33.

Input controller 34 negotiates with contention controller 7 for the assignment of a transmission time for the cell destined for the switch output port provided on lead 38. When the transmission time is received by input controller 34, it is output on lead 39 for storage in address control memory 33 with the address in which the cell is stored in cell memory 2. Address control memory maintains the list of cell transmission time assignments from the output port scheduler in the contention control. Memory 33 is read sequentially so that the appropriate read address is supplied on lead 36 to cell memory 2 causing the contents of cell memory 2 to be read and output on lead 4 at the assigned transmission time. In the exemplary embodiment, the locations in address control memory 33 relate to the scheduled or assigned transmission times. It should be noted that read/write and clear control signals for the various memories have been omitted from the FIGS. and are believed to be understood by persons skilled in the art.

Figure 3:
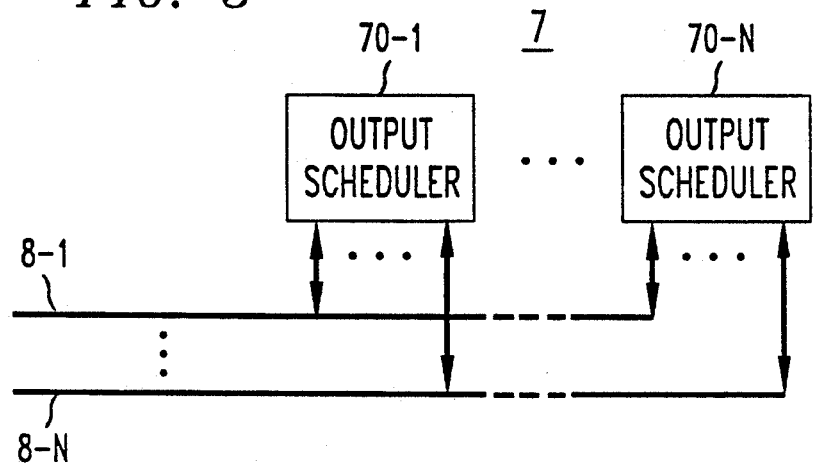
FIG. 3 is a more detailed block diagram of the contention control in FIG. 1.

Details of the contention control are shown in FIG. 3. Contention control 7 includes N independent output schedulers 70-1 through 70-N. There is an output scheduler associated with each switch output port. Each output scheduler receives inputs from, and negotiates with, the queue controls via leads 8-1 through 8-N. That is, each queue control communicates with each and every output scheduler. Of course, it is contemplated that a single output scheduler may be employed for scheduling arriving cells for the switch output ports. However, the use of a single output schedule for all N output ports is cumbersome. It should be noted that the use of independent output schedulers limits the achievable throughput to approximately 65%. This throughput penalty occurs because a switch output port assumes that the cell assigned a particular transmission time by the output scheduler will actually use that transmission time. If, because of prior transmission time reservations, input cannot transmit the cell to the switch and instead transmits a cell destined to a different switch output port, then an assigned transmission time is wasted.

Figure 4:
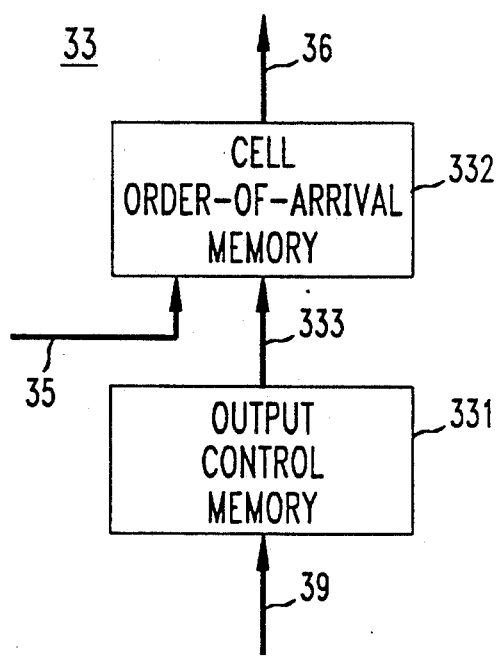
FIG. 4 depicts the address control memory of FIG. 2 in more detail.
Figure 5:
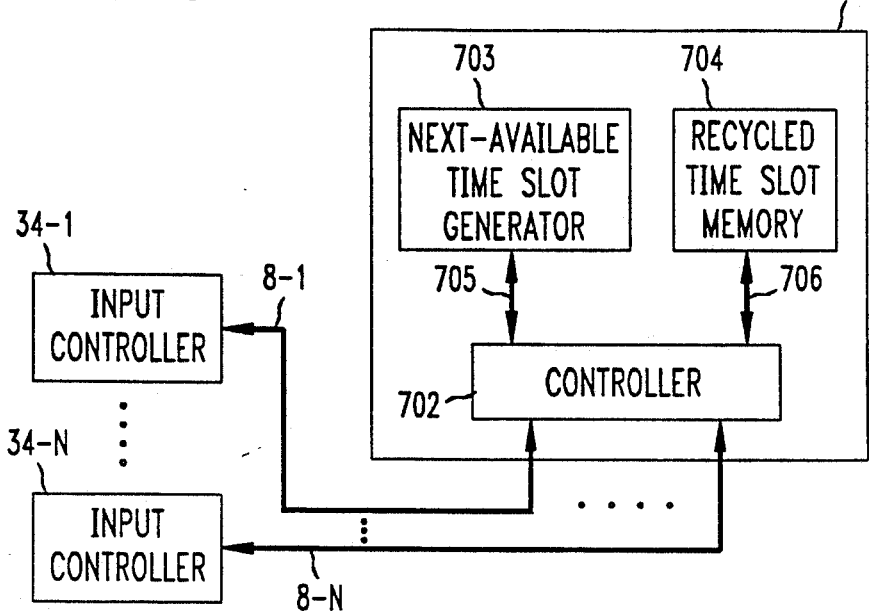
FIG. 5 shows the output scheduler for one particular output port of the switch realized in accordance with the principles of the present invention.

In order to significantly increase the achievable throughput of an input-queued packet switch with output port schedulers, the output schedulers are configured in accordance with the principles of the invention to permit recycling or reassignment of transmission times found to be unusable because of earlier assignments (reservations). A modified architecture for the input-queued, output scheduled packet switch is shown in FIGS. 4 and 5; FIG. 4 provides additional details for the address control memory while FIG. 5 provides additional detail for an exemplary output scheduler.

When modified in accordance with the principles of the invention as shown in the FIGS. and described below, the output scheduler and queue controls operate as follows. The output scheduler assigns a transmission time to a queue control for a particular input. The queue control realizes that the related cell cannot be transmitted at the assigned time due to a prior reservation. In the next scheduling period, the queue control makes a new request for the same cell (the same output port) and, in return, receives a new assigned transmission time from the output scheduler. Once the new time is received, the queue control returns the previously assigned transmission time to the appropriate output scheduler. The latter time is referred to as the "recycled transmission time slot" for the particular output. The output scheduler now stores the recycled time slot in a storage device such as a simple latch or FIFO memory. Recycled time slots are used for assignment to subsequent requests. That is, when an output scheduler obtains a time slot for recycling and subsequently receives a request for assignment of a time slot, the output scheduler assigns the recycled time slot to the cell for which this latest request is made. A recycled time slot is erased from the output scheduler's memory when that time slot passes without assignment to a cell.

Modification of the output scheduler in accordance with the principles of the invention for handling recycled time slots is shown in one exemplary embodiment in FIG. 5 for independent output scheduler 70-1. Output scheduler 70-1 negotiates with input controller 34-1 through 30-N of the respective queue controls. The output scheduler includes controller 702, next-available time slot generator 703, and recycled time slot memory 704. Next-available time slot generator 703 is connected to controller 702 via lead 705 whereas recycled time slot memory 704 is connected to controller 702 via lead 706.

When any of input controllers 34 request a transmission time assignment for their arriving cells, controller 702 receives the requests and checks recycled time slot memory 704 for the presence of one or more recycled time slots. If memory 704 is empty, then controller 702 activates next-available time slot generator 703. When activated, next-available time slot generator 703 produces the next available time slot. In an exemplary embodiment, next-available time slot generator 703 is implemented via a simple counter and adder circuit in which the counter keeps the next time slot number available for cell transmission, counts the total number of requests, and adds the total number of requests to the next time slot number. In the event that recycled time slot memory 704 has one or more time slots stored therein, controller 702 causes those time slots from memory 704 to be assigned to the request before any new time slots are produced by next-available time slot generator 703. After a transmission time is assigned for a particular input, the output scheduler via controller 702 stores any recycled time slots from that particular input in memory 704. If the recycled time slot were to be stored prior to time slot assignment, then the same transmission time returned by an input to the scheduler might be immediately reassigned to that same input. The present invention avoids this problem and maximizes the probability that recycled time slots will be assigned to inputs other than the input which returned the time slot. In turn, this maximizes the possibility that all assigned time slots will be used. By using this assignment technique, it is not possible for an input to receive the same transmission time assignment in two successive scheduling attempts. Also, deadlock situations are avoided because recycled time slots eventually expire and new transmission times are assigned. It is important to recognize that recycled time slots are always chronologically earlier than the next-available time slot in generator 703.

Recycled time slot memory 704 is realizable as a single location memory such as a latch or a multiple location memory such as a FIFO memory or a random access memory. The multiple location memory permits a plurality of recycled time slot to be stored. A FIFO memory implementation permits the plurality of recycled time slots to be stored in the order in which they are received. For a single location memory, only one recycled time slot would be stored: the earliest recycled time slot, the latest recycled time slot, or any single time slot in between the earliest and latest recycled time slot. From experimental practice, it has been determined that excellent performance and throughput is attainable even when the output scheduler only has space to store a single recycled time slot.

Controller 702 accepts the requests from the N queue controls. It is contemplated that the controller for a scheduler polls the queue controls in sequence from 1 to N or sequentially where the starting point of the sequence is increased by one or more each time through or the like. Barrel shifting the sequence for responding to requests is contemplated for introducing a degree of fairness into the scheduling process.

In order to maintain cell sequence for each input and to facilitate recycling of time slots, address control memory 33 is modified as shown in FIG. 4 and the operation of queue control 3 is modified as described below. Address control memory 33 includes output control memory 331 and cell order-of-arrival memory 332. Memories 331 and 332 are connected via lead 333. Output control memory 331 receives the transmission time assignment from input controller 34. Output control memory 331 is randomly written and sequentially read wherein the contents at a particular memory location designate the particular switch output port, if any, to which the input is scheduled to transmit a cell. Locations in output control memory 331 correspond to successive transmission time slots. Cell order-of-arrival memory 332 is realized as a FIFO memory having N identical partitions or, alternatively, as N FIFO memories. The number N relates to the number of switch output ports for switch 5. Each FIFO memory or partition relates to a particular switch output port so that it is possible to use the notation $FIFO_j$ is the FIFO memory in cell order-of-arrival memory 332 related to switch output port j where j=1, 2, ... N. $FIFO_j$ contains a first-in, first-out list of the cell memory addresses containing cells destined for output j. The information stored in $FIFO_j$ is obtained from memory 32 on lead 35.

In operation, output control memory 331 is read sequentially. At a particular transmission time, output control memory 331 may read a memory location whose contents indicate transmission from the related input to switch output port j. This information is transferred to cell order-of-arrival memory 332 causing the next available contents of $FIFO_j$ to be read. Since the contents of $FIFO_j$ are a first-in, first-out list of cell memory addresses, the next available cell memory address in $FIFO_j$ of memory 332 is read and output via lead 36 to cell memory 2. This, in turn, causes the appropriate cell to be retrieved from cell memory 2 and sent to switch 5.

Input controller 34 negotiates with the output scheduler for transmission time assignments for its cells, as described above. In addition, input controller 34 determines whether there is a prior reservation for the same transmission time just assigned by the output scheduler. That is, controller 34 checks (reads) the appropriate location in memory 331 to see whether there is an entry. If the location in memory 331 is empty, the controller accepts the assignment and complete storage of the assigned transmission time for the cell in the address control memory. If the location in memory 331 is non-empty, then controller 34 rejects the transmission time assignment for the cell. During the next scheduling attempt or scheduling cycle, controller 34 initiates yet another request for transmission time assignment for the cell and, upon receipt of the newly assigned transmission time from the output scheduler, returns the unusable (previously assigned) transmission time to the scheduler for recycling. As such, input controller 34 keeps requesting transmission time slot assignments to output j until it receives an assignment which it can use. All unusable time slots are returned by the input controller so that another input can possibly make use of the time slot for its own transmission to output j.

From experimental practice, it has been determined that an input-queued, output-scheduled switch realized in accordance with the principles of the present invention has a markedly improved throughput of 92% for a random cell arrival model. Recycling of only one time slot in each output scheduler was used to achieve this result. Further improvement of throughput to 95% is possible with the combination of time slot recycling and input grouping.

Figure 6:
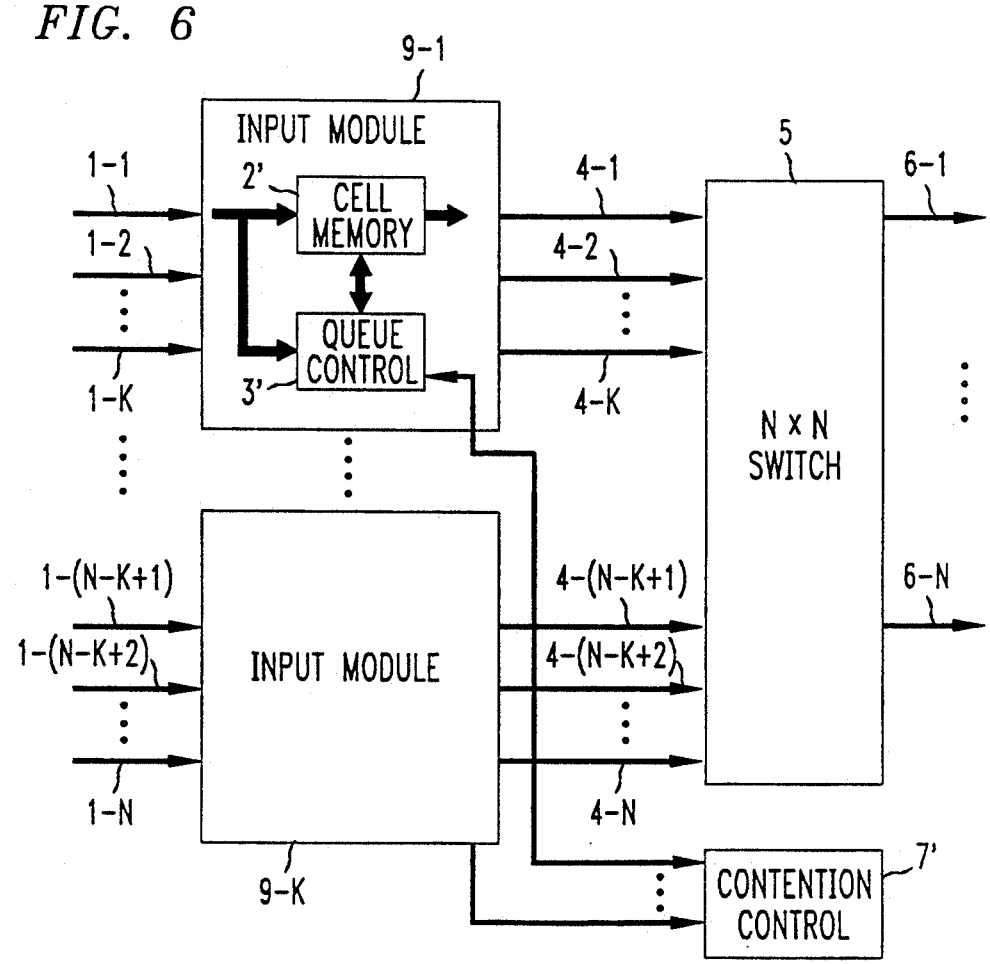
FIG. 6 shows a simplified block diagram of an alternative embodiment employing input grouping.

An embodiment depicting input grouping is shown in FIG. 6. In this embodiment, k input ports are grouped together so that the cells arriving at the k inputs of input modules 9-1 through 9-(N/k) are stored in cell memory 2' and so that the cell memory is controlled by a single queue control 3'. Queue control 3' operates in a way to permit a plurality of cells up to k to be output from the cell memory to the different switch input ports in the group. As such, the address control memory in queue control 3' has locations which store up to k assignments in any given transmission time slot. Regardless of on which input port 1 of the group a cell is received, the cell may be controlled by the cell memory and queue control to exit on a different switch input port 4 destined for a different output port from the other cells transmitted in the same transmission time slot. The embodiment shown in FIG. 6 is further modified in that each input scheduler in contention control 7' receives inputs from only N/k queue controls because of input grouping.

Although not explicitly shown, it is understood that the cell memory may be read faster than it is written so that cells are sent to the switch 5 at a faster rate than they are received at the input port 1. This is called "speed up" and is another form of input grouping which is expected to produce similar throughput improvements when coupled with time slot recycling.

What is claimed is:

1. Apparatus for scheduling arriving packet cells for input to a switch having a plurality of input ports and output ports, the apparatus comprising:

means, associated with each input port, for storing the packet cells arriving at the associated input port, means, associated with each input port, for controlling the storage of packet cells in the storing means by requesting from a contention control means a transmission time for one arriving packet cell in which the one arriving packet cell is granted access to one of the plurality of output ports of the switch from the associated input port, by accepting the transmission time assigned by the contention control, and by returning a previously assigned transmission time, contention control means for assigning a transmission time to each request for access an output port of the switch and for storing at least one previously assigned transmission time returned by the controlling means.

2. The apparatus as defined in claim 1 wherein the contention control means includes a plurality of scheduling means, each scheduling means associated with one of the plurality of output ports for scheduling each request for the associated one of the plurality of output ports into a different transmission time.

3. The apparatus as defined in claim 2 wherein each scheduling means further includes, means for storing the previously assigned transmission time, means for generating a next-available transmission time, and means responsive to a request for selectively assigning the transmission time from one of the transmission time storing means and the transmission time generating means.

4. The apparatus as defined in claim 3 wherein the means for storing the previously assigned transmission time includes means for storing more than one previously assigned transmission time.

5. The apparatus as defined in claim 3 wherein the scheduling means further includes means for erasing the previously assigned transmission time from the transmission time storing means.

6. The apparatus as defined in claim 2 wherein the controlling means includes, means for maintaining the packet cells in their original order-of-arrival, and means for storing the transmission time assigned to the packet cell for transmission through the switch.

7. The apparatus as defined in claim 6 wherein the controlling means includes, means for determining whether the presently assigned transmission time has been reserved in the transmission time storing means for another transmission, and means responsive to the determining means for returning the presently assigned transmission time to the contention control means when the transmission time has been previously reserved.

8. The apparatus as defined in claim 7 wherein the controlling means further includes means for delaying return of the previously assigned transmission time by the means for returning.

9. The apparatus as defined in claim 1 wherein the controlling means further includes means for retrieving the stored packet cell from the storing means at the assigned transmission time.

* * * * *